(12) United States Patent
Andres et al.

(10) Patent No.: US 10,464,195 B2
(45) Date of Patent: Nov. 5, 2019

(54) METHOD FOR CONTROLLING A SCREWDRIVER AND SCREWDRIVER

(71) Applicant: WAGNER VERMÖGENSVERWALTUNGS-GMBH & CO. KG, Much (DE)

(72) Inventors: Günter Andres, Much Marienfeld (DE); Günter Neiss, Alfter (DE); Andreas Zimmer, Troisdorf (DE); Bernd Linsel, Siegen (DE); Daniel Bozek, Neunkirchen-Seelscheid (DE)

(73) Assignee: WAGNER VERMÖGENSVERWALTUNGS-GMBH & CO. KG, Much (DE)

( * ) Notice: Subject to any disclaimer, the term of this patent is extended or adjusted under 35 U.S.C. 154(b) by 526 days.

(21) Appl. No.: 14/440,237

(22) PCT Filed: Nov. 8, 2013

(86) PCT No.: PCT/EP2013/073340
§ 371 (c)(1),
(2) Date: May 1, 2015

(87) PCT Pub. No.: WO2014/072450
PCT Pub. Date: May 15, 2014

(65) Prior Publication Data
US 2015/0290784 A1    Oct. 15, 2015

(30) Foreign Application Priority Data

Nov. 9, 2012 (DE) .................. 10 2012 220 482

(51) Int. Cl.
*B25B 23/147*    (2006.01)
*B25B 21/00*    (2006.01)
*G01P 3/44*    (2006.01)

(52) U.S. Cl.
CPC ............ *B25B 23/147* (2013.01); *B25B 21/00* (2013.01); *G01P 3/44* (2013.01)

(58) Field of Classification Search
CPC .......... B25B 23/147; B25B 21/00; G01P 3/44
(Continued)

(56) References Cited

U.S. PATENT DOCUMENTS 3,543,902 A * 12/1970 Tsuji ..................... B25B 23/145
                                                        192/150
3,845,373 A * 10/1974 Totsu .................... B25B 23/147
                                                        318/434
(Continued)

FOREIGN PATENT DOCUMENTS

DE    3215734 A1   11/1983
DE    35 00 714 C1   12/1988
(Continued)

OTHER PUBLICATIONS

International Search Report dated Jan. 27, 2014 from corresponding Int'l Application No. PCT/EP2013/073340; 4 pages.
(Continued)

*Primary Examiner* — Nathaniel C Chukwurah
*Assistant Examiner* — Lucas E. A. Palmer
(74) *Attorney, Agent, or Firm* — Maier & Maier, PLLC

(57) ABSTRACT

A method for controlling a screwdriver that has an electromotor, the electromotor having a clear ratio of rotational speed (n) to torque (M) at a defined effective voltage ($U_{eff\,soll}$), involving the following method step: —defining an effective voltage ($U_{eff\,soll}$) for operating the electromotor, —defining a cut-off rotational speed ($n_{ab}$) that corresponds to a pre-defined cut-off torque ($M_{soll}$) at the pre-defined effective voltage ($U_{eff\,soll}$), —operating the screwdriver under load with the pre-defined effective voltage ($U_{eff\,soll}$), —during operation of the screwdriver: —determining the
(Continued)

Figure 1:
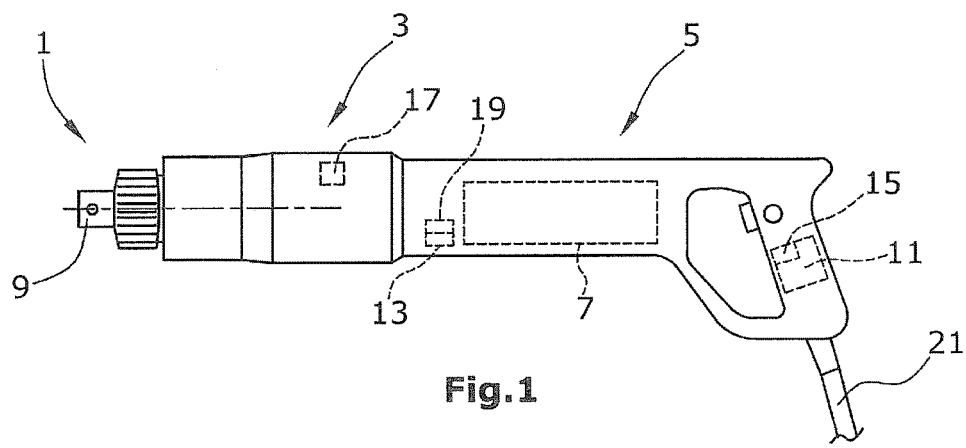

rotational speed (n), —shutting down the electromotor when the cut-off rotational speed ($n_{ab}$) is attained.

12 Claims, 1 Drawing Sheet

(58) Field of Classification Search
USPC .................................................. 173/1
See application file for complete search history.

(56) References Cited

U.S. PATENT DOCUMENTS

| | | | | |
|---|---|---|---|---|
| 4,156,162 A * | 5/1979 | Warfield | ................ | H02P 7/293 318/433 |
| 5,341,454 A * | 8/1994 | Orii | ................ | D05B 69/18 388/815 |
| 5,410,236 A * | 4/1995 | Arroubi | ................ | H02P 25/145 318/800 |
| 5,975,396 A * | 11/1999 | Manabe | ................ | B27F 7/36 227/131 |
| 6,047,455 A * | 4/2000 | Hansson | ................ | B23P 19/066 173/180 |
| 6,167,606 B1 * | 1/2001 | Mueller | ................ | B23P 19/066 173/181 |
| 6,296,065 B1 * | 10/2001 | Carrier | ................ | B25F 5/02 173/171 |
| 6,680,595 B2 * | 1/2004 | Ito | ................ | B25B 23/1405 173/11 |
| 8,217,610 B2 * | 7/2012 | Watanabe | ................ | H02H 11/00 173/20 |
| 8,371,393 B2 * | 2/2013 | Higuchi | ................ | B27F 7/19 173/1 |
| 8,912,742 B2 * | 12/2014 | Ohsugi | ................ | H02P 27/08 318/400.24 |
| 2001/0010267 A1 * | 8/2001 | Kawarai | ................ | B25B 23/1453 173/180 |
| 2003/0044172 A1 * | 3/2003 | Osselmann | ................ | H02P 25/14 388/800 |
| 2003/0047331 A1 * | 3/2003 | Henderson | ................ | B23P 19/066 173/4 |
| 2003/0155878 A1 * | 8/2003 | Murai | ................ | B60L 15/2009 318/268 |
| 2003/0233200 A1 * | 12/2003 | Petrovic | ................ | G01P 3/44 702/57 |
| 2007/0247097 A1 * | 10/2007 | Seiler | ................ | B25B 23/147 318/432 |
| 2010/0039053 A1 * | 2/2010 | Matsutani | ................ | B23P 19/066 318/68 |
| 2010/0059240 A1 * | 3/2010 | Schmidt | ................ | B25B 21/00 173/1 |
| 2010/0065293 A1 * | 3/2010 | Lohr | ................ | B25B 23/147 173/1 |
| 2010/0101381 A1 * | 4/2010 | Gareis | ................ | B25B 21/00 81/479 |
| 2010/0116519 A1 * | 5/2010 | Gareis | ................ | B25B 23/147 173/176 |
| 2010/0263895 A1 * | 10/2010 | Bosch | ................ | H02M 1/44 173/217 |
| 2012/0306425 A1 * | 12/2012 | Obatake | ................ | B25F 5/00 318/503 |
| 2013/0068491 A1 * | 3/2013 | Kusakawa | ................ | B25B 21/00 173/176 |
| 2013/0172507 A1 * | 7/2013 | Ebisawa | ................ | G01N 11/14 526/329.7 |
| 2013/0175961 A1 * | 7/2013 | Suzuki | ................ | B25B 21/00 318/443 |
| 2014/0184122 A1 * | 7/2014 | Ogawa | ................ | E02F 9/2095 318/461 |
| 2014/0262390 A1 * | 9/2014 | Arimura | ................ | B25B 21/02 173/7 |
| 2015/0047866 A1 * | 2/2015 | Sakai | ................ | B25F 5/00 173/179 |
| 2015/0150556 A1 * | 6/2015 | McCuen | ................ | A61B 17/07207 227/175.1 |

FOREIGN PATENT DOCUMENTS

| | | | | |
|---|---|---|---|---|
| DE | 10 2007 055718 A1 | | 6/2009 | |
| EP | 0 422 388 A1 | | 4/1991 | |
| EP | 0422388 B1 * | | 3/1995 | ........ H02H 7/0851 |
| EP | 0 721 695 B1 | | 8/1997 | |
| JP | S6096996 U | | 7/1985 | |
| JP | 2000-127059 A | | 5/2000 | |
| JP | 2001-62744 A | | 3/2001 | |
| JP | 2008-221372 A | | 9/2008 | |
| JP | 2009202317 A | | 9/2009 | |
| WO | WO 9510135 A1 * | | 4/1995 | ............ B25B 23/14 |

OTHER PUBLICATIONS

German Examination Report dated Jul. 23, 2013 from corresponding German Patent Application No. 102012220482.2; 5 pages.
Japanese Examination Report dated Sep. 19, 2017 from corresponding Japan Patent Application No. 2015-531147; 2 pages.
Office Action dated Apr. 24, 2018 in corresponding Japanese Application No. 2015-541147; 6 pages.
Japanese Office Action dated Sep. 11, 2018, in connection with corresponding JP Application No. 2015-541147 (6 pgs., including English translation).

\* cited by examiner

METHOD FOR CONTROLLING A SCREWDRIVER AND SCREWDRIVER

The invention refers to a method for controlling a screwdriver having an electric motor, and to a screwdriver having an electric motor.

Electrically driven screwdrivers comprise a drive portion with an electric motor and an output portion. The drive portion is mechanically coupled with the output portion, e.g. via a transmission. The output portion typically has a shaft socket with a square cross section onto which for example a wrench socket may be set.

Screwdrivers with electric motors are known where the torque-related cutoff is effected by means of the current drawn by the motor, when a predetermined torque is reached. In this case, a set value for the current is preset by means of an actuator. During the screwing operation, the current is measured continuously after the start-up phase, wherein, as soon as the predefined set value for the current is reached or exceeded, a control interrupts further current supply and thereby switches off the screwdriver.

When using a control that uses the measured variable "current", problems or inaccuracies can occur, since at the same time the current is the control variable for a possible rotational speed limitation or rotational speed regulation. Changes in current that are due to changes in this control variable will therefore result in interferences with the measured value of the torque control. Further, the current in the electric motor flows through a commutator that causes considerable current fluctuations which can only be compensated by a corresponding smoothing of the measured values. As a result, in control, the relevant current changes are evaluated with a delay.

For a control to be performed with the use of current as a parameter, a previously determined motor characteristic has to be stored in the control. However, the actual characteristic during operation may differ, for example, because of the position of the armature relative to the field or due to the resistance in the current path caused by the commutator, which resistance can depend on manufacturing tolerances, wear of the coal pieces, as well as on mechanical changes in the positions of the coal pieces. If these deviations were to be taken into account, additional and very complex sensors would have to be provided.

With such a control, a switch-off at the torque to be reached is often effected at rather high rotational speeds so that the high kinetic residual energy causes a further, uncontrolled increase in torque which represents another inaccuracy.

It is known from DE 35 00 714 to control a screwdriver by adjusting the motor operating voltage so that the motor can be operated along different motor characteristics. This screwdriver is based on the insight that the electric motor generates the highest torque shortly before standstill of the electric motor. Thus, a motor characteristic is selected where the torque attainable at standstill of the electric motor corresponds to the desired torque, and the electric motor is operated with the motor operating voltage underlying that characteristic.

However, such a method can cause problems, since, every time the motor is switched off, the motor is operated until standstill, whereby it is subjected to a short circuit current. This may result in damage to the motor or special motors have to be selected that allow such a manner of operation. The minimum cutoff torque that can be set with the known screwdriver has a lower limit, because a minimum operating voltage has to be present in order to operate the electric motor. Therefore, the torque that can be attained at this minimum operating voltage, when the motor stands still, is the minimum adjustable cutoff torque.

Thus, it is an object of the present invention to provide a method for controlling a screwdriver, as well as a screwdriver, wherein, while avoiding the disadvantages of prior art, a cutoff torque can be set in a flexible manner, while at the same time the motor is prevented from operating in the short circuit current range.

The method of the present invention is defined by the features of claim 1. The screwdriver of the present invention is defined by the features of claim 8.

According to the method of the present invention, the following steps are performed to control a screwdriver having an electric motor, wherein, at a given effective voltage, the electric motor has a distinct ratio of rotational speed and torque:

predefining an effective voltage for the operation of the electric motor, predefining a cutoff rotational speed which corresponds to a predetermined cutoff torque at the predefined effective voltage, operating the screwdriver under load with the predefined effective voltage, during operation of the screwdriver:

determining the rotational speed, switching off the electric motor when reaching the cutoff rotational speed.

The method according to the present invention is based on the insight that with certain electric motors, a distinct ratio of rotational speed to torque exists at a given effective voltage. This means that the motor characteristic existing at a given effective voltage has a steady course and a distinct torque value can be associated with every rotational speed. In order to reach a desired cutoff torque, two values are thus predefined. First, the effective voltage for operating the electric motor is predefined, whereby a motor characteristic is selected. Thereafter, the cutoff rotational speed corresponding to the predefined cutoff torque is determined on that motor characteristic and is predefined. While the screwdriver operates under load, i.e. the screwdriver is set on a screw to be turned, the rotational speed, e.g. of the electric motor, is continuously checked, and the electric motor is switched off when the previously defined cutoff rotational speed is reached.

Thus, the reaching of the cutoff torque can be monitored in a very simple manner. In addition, the method of the present invention allows for a flexible adjustment of the cutoff torque, making it possible to set almost any cutoff torque. Since the method of the present invention does not depend on reaching the cutoff torque by operating the electric motor until standstill, any optional cutoff rotational speed can be predefined. Further, predefining the rotational speed is possible in a simple manner so that the method of the present invention can be performed with little technical effort regarding devices.

In the method of the present invention it may be provided that the effective voltage is controlled by means of pulse width modulation or phase angle control. In this manner, the effective voltage can be predefined in a very simple and very precise manner.

In this context, it may be provided that the phase angle or the pulse width modulation can be set in a variable manner. This makes it possible to maintain the effective voltage constant during operation, e.g. in case of a fluctuating mains voltage. For this purpose, for instance, a control may be provided that monitors the effective voltage or the mains voltage and readjusts the phase angle correspondingly.

The method of the present invention may provide that the available mains voltage is determined and the electric motor is switched off if the available mains voltage is insufficient to provide the predefined effective voltage. In this context it may be provided that a corresponding error indication is generated and indicated, e.g. by a control means. This has the advantage that a screwdriver controlled by means of the method of the present invention is started only if the predefined cutoff torque can actually be reached.

It may also be provided that, during operation of the screwdriver, the effective voltage present at the electric motor under load is determined, and that the effective voltage is adjusted if the effective voltage deviates from the predefined effective voltage. This is preferably done by adjusting the phase angle.

Thus, the method of the present invention makes it possible to switch off the screwdriver at the predefined cutoff torque with very high accuracy, since, due to the method of the present invention, the predefined effective voltage is maintained with high accuracy. Thereby, in the method of the present invention, the electric motor is operated with high reliability on the motor characteristic selected by the predefined effective voltage.

In a variant of the method of the present invention it may be provided that the maximum rotational speed that can be generated by the electric motor is limited. Thereby, e.g. when the load on the screwdriver is too low, it is avoided that the electric motor overspeeds, whereby damage to the electric motor is avoided.

In a particularly preferred embodiment of the method of the present invention it is provided that, after activation of the electric motor, a cutoff control, which regulates the switching off of the electric motor, is activated only after the cutoff rotational speed has been exceeded once or after a predetermined period. Since, after activation, the electric motor first starts up from standstill, the electric motor is operated below the cutoff rotational speed for a certain time after start-up. In order to avoid that the cutoff control switches the electric motor off already in the start-up phase, this cutoff control only becomes active when the preselected cutoff rotational speed has been reached or exceeded once, or after the motor has already been operated for a certain period so that it can be guaranteed that the motor has exceeded the cutoff rotational speed. Thereby, the control method of the present invention can be performed with high reliability.

In the method of the present invention, the rotational speed may be determined from operation data of the electric motor or it may also be measured directly. Here, the rotational speed can be determined either directly at the output shaft of the electric motor or at an output portion of the screwdriver. However, in doing so, it should be observed that, when the rotational speed is determined at the output portion of the screwdriver, possible interposed gearings must be taken into account.

In a screwdriver of the present invention having an output portion and a drive portion with an electric motor, wherein the electric motor has a distinct ratio of rotational speed to torque at a given effective voltage and the drive portion comprises a control means for controlling the electric motor, wherein an effective voltage driving the electric motor can be set by means of the control means, it is provided that a rotational speed detecting device detects the rotational speed of the electromotor during operation of the screwdriver, a cutoff rotational speed can be set by means of the control means, and the rotational speed detecting device transmits the detected rotational speed to the control means, with the control means switching off the electric motor when the cutoff rotational speed is reached.

The screwdriver of the present invention can thus be operated in a particularly advantageous manner using the present method for controlling a screwdriver. By predefining an effective voltage and a cutoff rotational speed, the present screwdriver makes it possible to determine a cutoff torque with high accuracy, at which cutoff torque the screwdriver is switched off when in operation. Due to the control means of the present invention, the screwdriver can be used in a particularly advantageous and flexible manner.

It may be provided, according to the invention that the control means comprises a phase angle control or pulse width modulation to adjust the effective voltage. Such a control has been found to be particularly effective in adjusting the effective voltage.

As the electric motor, universal motors or DC motors may be used, for example. Advantageously, such motors are commercially available and have a distinct ratio of rotational speed to torque at a given effective voltage.

It may be provided that the control means or the output portion comprises a rotational speed limiter. If the rotational speed limiter is arranged in the output portion, it may for instance be mechanical. In the control means, the rotational speed limiter is preferably electronic. Providing a rotational speed limiter prevents the electric motor from overspeeding, e.g. when the load is too low, and from being damaged as a consequence.

In one embodiment of the invention it is provided that a rotational speed counter is arranged at the drive portion or at the electric motor. The rotational speed detecting device may comprise a rotational speed counter which may, for example, be a pulse generator of the magnetic or optical type or a Hall sensor. The rotational speed counter may, for example, be arranged at the electric motor, the drive portion or the output portion. Of course, it is also possible to detect the rotational speed electronically in the control means.

The following is a detailed description of the invention with reference to the following Figures.

Figure 2:
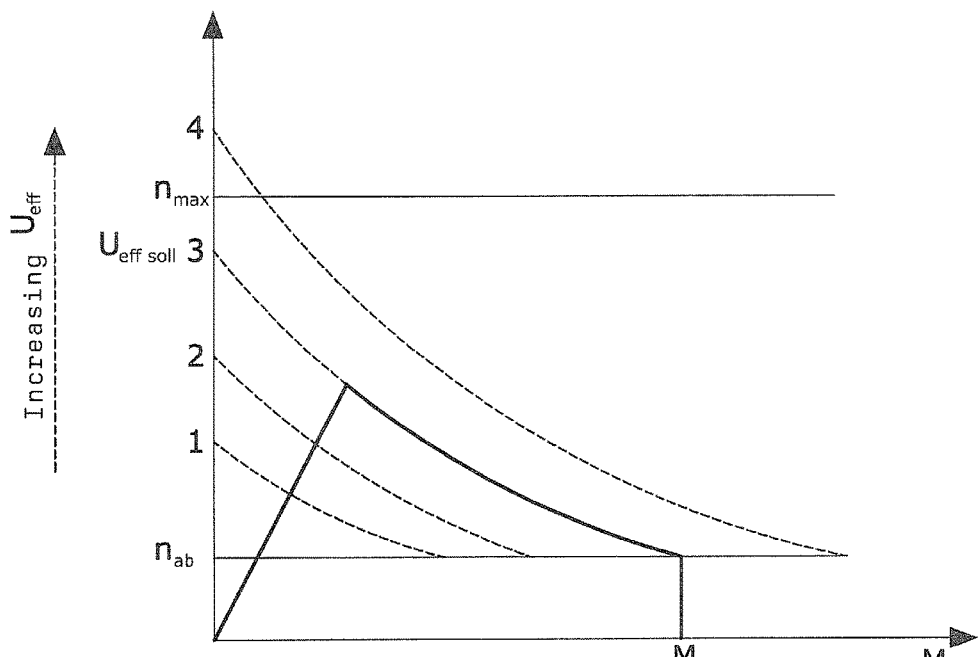

In the Figures:

FIG. 1 is a schematic side elevational view of a screwdriver according to the present invention, and FIG. 2 is a schematic illustration of different motor characteristics of an electric motor of a screwdriver according to the present invention.

FIG. 1 schematically illustrates a screwdriver 1 of the present invention in side elevational view. The screwdriver 1 has an output portion 3 and a drive portion 5. The drive portion 5 comprises an electric motor 7 by which the output portion 3 can be rotated. In FIG. 1, the electric motor 7 is shown only schematically. The output portion 3 may comprise a transmission, not illustrated in FIG. 1, by which the rotary movement generated by the electric motor 7 is transformed and transmitted to a square shaft 9. The square shaft 9 serves to receive a wrench socket, for example, with which the screwdriver 1 can be set on a screw, not illustrated herein.

The electric motor 7, which may for example be designed as a DC motor or a universal motor, has a distinct ratio of rotational speed n to torque M at a given effective voltage $U_{eff}$. Thus, with the effective voltage $U_{eff}$ given, a distinct torque M can be associated with every rotational speed n.

The electric motor 7 can be controlled via a control means 11. In this regard, an effective voltage $U_{eff}$ driving the electric motor can be set at the control means 11 as the predefined effective voltage $U_{eff\,soll}$. Further, a cutoff rotational speed $n_{ab}$ can be set via the control means 11. A rotational speed detecting device 13 detects the rotational speed of the electric motor 7 during the operation of the screwdriver 1. The rotational speed detected by the rotational speed detecting device 13 is supplied to the control means 11 during operation, with the control means 11 switching off the electric motor 7 when the cutoff rotational speed $n_{ab}$ is reached. The cutoff rotational speed $n_{ab}$ is defined in advance such that, when the cutoff rotational speed $n_{ab}$ is reached, the cutoff torque $M_{soll}$ is generated by the electric motor 7. In this regard, the cutoff torque $M_{soll}$ is selected such that the desired torque is transmitted to the screw by means of the output device 3.

The control means 11 includes a phase angle control 15 for adjusting the effective voltage $U_{eff}$. The effective voltage $U_{eff}$ can be adjusted in an advantageous manner by means of the phase angle control 15. In this regard, the phase angle control 15 may also include a regulating means by which the predefined effective voltage $U_{eff\ soll}$ is maintained on the predefined value, thereby allowing the readjustment of fluctuations in the mains voltage or changes in the effective voltage present at the electric motor 7 under load.

The output portion 3 may comprise a rotational speed limiter 17 by means of which the rotational speed of the electric motor 7 is limited. In the embodiment of the invention illustrated, the rotational speed limiter 17 is of a mechanical design, for example. Of course, it is also possible that the control means includes the rotational speed limiter and that the latter is operated electronically. The rotational speed limiter may also be arranged in the drive portion 5.

The rotational speed detecting device 13 may comprise a rotational speed counter 19 configured, for example, a magnetic or optical pulse generator or as a Hall sensor.

In the embodiment illustrated in FIG. 1, the screwdriver 1 is supplied with power via a cable connection 21. Of course, it is also possible that the screwdriver 1 has an accumulator and is thus independent from the mains.

The screwdriver 1 of the invention is adapted to be operated advantageously by means of the present method for controlling a screwdriver.

For the purpose of explaining the method of the invention, FIG. 2 illustrates a plurality of motor characteristics for different effective voltages $U_{eff}$. The motor characteristics for the individual effective voltages continuously decline, so that, at a given effective voltage $U_{eff}$, each rotational speed n can be associated with a distinct torque M. In operation of the screwdriver 1 of the present invention, first, an effective voltage $U_{eff}$ is defined, by means of which cutoff torque $M_{soll}$ can be reached. The cutoff torque $M_{soll}$ is a torque at which the desired torque to be applied to the screw connection becomes attainable. In the embodiment illustrated in FIG. 2, the third motor characteristic is the motor characteristic that corresponds to the predefined effective voltage $U_{eff\ soll}$. Further, a cutoff rotational speed $n_{ab}$ is predefined which, at the predefined effective voltage $U_{eff\ soll}$ generates the cutoff torque $M_{soll}$. The electric motor 7 is now driven at the predefined effective voltage $U_{eff\ soll}$. Here, the electric motor 7 first starts up until the rotational speed n reaches the motor characteristic defined by the effective voltage. In doing so, the electric motor 7 also traverses a rotational speed range that corresponds to the cutoff speed $n_{ab}$. In order to prevent the control means 11 from switching off the electric motor 7 at that moment already, the control means 11 may include a cutoff logic that is activated only after the cutoff rotational speed $n_{ab}$ has been reached and exceeded once. As time proceeds, the electric motor 7 is operated on the selected motor characteristic. The torque is increased by the load of the screw connection acting on the electric motor 7, so that the rotational speed n decreases. In the operation of the screwdriver 1, the rotational speed n is permanently monitored by the rotational speed detecting device 13. When the cutoff rotational speed $n_{ab}$ is reached, the electric motor 7 is switched off by the control means 11, with the cutoff torque $M_{soll}$ being reached.

As is evident from FIG. 2, a maximum rotational speed $n_{max}$ is also predefined, with the rotational speed of the electric motor 7 being limited to this rotational speed by the rotational speed limiter 17.

The method of the present invention thus enables a flexible adjustment of almost any cutoff torque, by requiring to predefine only an effective voltage $U_{eff}$ and a cutoff rotational speed. Since the method of the present invention makes it possible to avoid an operation of the electric motor until standstill such that it experiences a short circuit current, damage to the electric motor 7 is also prevented, so that almost any DC or universal motor can be used.

The invention claimed is:

1. A method for controlling a screwdriver having an electric motor, the electric motor having a distinct ratio of rotational speed to torque at a given effective voltage, the method comprising:
   predefining a constant effective voltage for the operation of the electric motor, said predefined effective voltage associated with an unloaded rotational speed;
   predefining a cutoff rotational speed which corresponds to a predetermined cutoff torque at the predefined effective voltage, the cutoff rotational speed being a minimum speed threshold below which the cutoff torque is exceeded;
   operating the screwdriver under load, wherein operating the screwdriver under load comprises maintaining the predefined effective voltage without controlling the rotational speed of the motor by dynamically adjusting the current;
   during operation of the screwdriver under load, determining a detected rotational speed of the electric motor when the electric motor is operating at the predefined effective voltage, said detected rotational speed being less than the unloaded rotational speed; and
   when the detected rotational speed at the predefined effective voltage is decreased to the cutoff rotational speed by the load, switching off the electric motor.

2. The method of claim 1, wherein the effective voltage is regulated by means of pulse width modulation or phase angle control.

3. The method of claim 2, wherein the phase angle or the pulse width modulation can be adjusted in a variable manner.

4. The method of claim 1, wherein, in operation, the effective voltage present at the electric motor is determined, and the effective voltage is adjusted if the effective voltage deviates from the predefined effective voltage.

5. The method of claim 1, wherein a maximum rotational speed that the electric motor can generate is limited.

6. The method of claim 1, wherein after the start of the electric motor, a cutoff logic regulating the switching off of the electric motor is activated only after the cutoff speed has previously been reached or exceeded once or after a predefined period of time.

7. The method of claim 1, wherein the rotational speed is determined from operational data of the electric motor or is measured directly.

8. A screwdriver, comprising:

an output portion and a drive portion having an electric motor, the electric motor having a distinct ratio of rotational speed to torque at a given effective voltage, and the drive portion having a control means for controlling the electric motor, an effective voltage driving the electric motor being adjustable by means of the control means, said effective voltage being associated with an unloaded rotational speed, wherein a rotational speed detecting device detects the rotational speed of the electromotor during operation of the screwdriver under load, wherein operation of the electric motor under load comprises operation of the electric motor at the effective voltage without control of the rotational speed of the motor based on dynamic adjustment of the current, said detected rotational speed being less than the unloaded rotational speed, wherein a cutoff rotational speed, which at a predefined constant effective voltage corresponds to a predetermined cutoff torque, the cutoff rotational speed being a minimum speed threshold below which the cutoff torque is exceeded, is set by means of the control means, and wherein the rotational speed detecting device transmits the detected rotational speed to the control means, with the control means switching off the electric motor when the detected rotational speed at the effective voltage is decreased to the cutoff rotational speed by the load.

9. The screwdriver of claim 8, wherein the control means comprises a pulse width modulation or phase angle control for adjusting the effective voltage.

10. The screwdriver of claim 8, wherein the electric motor is a universal motor or a DC motor.

11. The screwdriver of claim 8, wherein the control means or the output portion comprises a rotational speed limiter.

12. The screwdriver of claim 8, wherein the rotational speed detecting device comprises a rotational speed counter.

* * * * *